United States Patent
Hotta et al.

(10) Patent No.: US 9,458,939 B2
(45) Date of Patent: Oct. 4, 2016

(54) MECHANISM FOR MOVING CIRCULAR PLATE-SHAPED MEMBER

(75) Inventors: Yasuhiro Hotta, Hyogo (JP); Takashi Sakamoto, Hyogo (JP)

(73) Assignee: KABUSHIKI KAISHA POWREX, Hyogo (JP)

( * ) Notice: Subject to any disclaimer, the term of this patent is extended or adjusted under 35 U.S.C. 154(b) by 19 days.

(21) Appl. No.: 13/700,538

(22) PCT Filed: Sep. 29, 2010

(86) PCT No.: PCT/JP2010/066891
§ 371 (c)(1),
(2), (4) Date: Nov. 28, 2012

(87) PCT Pub. No.: WO2012/014335
PCT Pub. Date: Feb. 2, 2012

(65) Prior Publication Data
US 2013/0068981 A1    Mar. 21, 2013

(30) Foreign Application Priority Data

Jul. 28, 2010 (JP) .................................. 2010-169540

(51) Int. Cl.
*F16K 25/00* (2006.01)
*F16K 1/22* (2006.01)
(Continued)

(52) U.S. Cl.
CPC ............... *F16K 1/221* (2013.01); *F16K 1/205* (2013.01); *F16K 1/2007* (2013.01);
(Continued)

(58) Field of Classification Search
CPC ................... F16K 1/24; F16K 5/204

USPC ....... 251/192, 305, 308, 215, 229, 162, 188, 251/306, 307, 228, 187, 201, 56
See application file for complete search history.

(56) References Cited

U.S. PATENT DOCUMENTS 2,655,942 A * 10/1953 Dougherty .................... 251/163
2,673,061 A *  3/1954 Broz ............................. 251/227
(Continued)

FOREIGN PATENT DOCUMENTS

DE       41 13 019      10/1992
EP        0 006 640      1/1980
(Continued)

OTHER PUBLICATIONS

International Search Report issued Dec. 21, 2010 in International (PCT) Application No. PCT/JP2010/066891.
(Continued)

*Primary Examiner* — John K Fristoe, Jr.
*Assistant Examiner* — Hailey K Do
(74) *Attorney, Agent, or Firm* — Wenderoth, Lind & Ponack, L.L.P.

(57) ABSTRACT

A butterfly valve has a circular plate-shaped valve element, a pair of support shafts, a pair of support shaft moving units, and a drive shaft. The valve element is seated on and removed from the valve seat from below. The drive shaft drives and rotates the support shafts. As the support shafts are rotated by the drive shaft, the valve element is rotated and inverted. The support shaft moving units include decentered shafts that are rotatably supported by casings and in which the support shafts are respectively inserted in a decentered state, and air cylinders configured to apply a force to the support shafts in the upward and downward direction. When the valve element is seated on or removed from the valve seat, the valve element is moved in the upward and downward direction in a horizontal posture as the air cylinders operate.

9 Claims, 3 Drawing Sheets

(51) Int. Cl.
  *F16K 5/20* (2006.01)
  *F16K 1/24* (2006.01)
  *F16K 1/20* (2006.01)
  *F16K 1/226* (2006.01)

(52) U.S. Cl.
  CPC .......... *F16K 1/2028* (2013.01); *F16K 1/2078* (2013.01); *F16K 1/224* (2013.01); *F16K 1/2261* (2013.01); *F16K 1/2268* (2013.01); *F16K 1/24* (2013.01); *F16K 5/204* (2013.01)

(56) References Cited

U.S. PATENT DOCUMENTS

| | | | | |
|---|---|---|---|---|
| 3,192,644 | A * | 7/1965 | Knibbs et al. | 34/589 |
| 3,556,476 | A * | 1/1971 | Haenky | 251/306 |
| 3,675,894 | A * | 7/1972 | Friedell | 251/163 |
| 4,509,718 | A * | 4/1985 | Bormioli | 251/163 |
| 5,755,427 | A | 5/1998 | Koskinas | |
| 2008/0230734 | A1 | 9/2008 | Nozawa | |

FOREIGN PATENT DOCUMENTS

| | | | |
|---|---|---|---|
| FR | 1 392 279 | 3/1965 | |
| FR | 2250414 A5 * | 5/1975 | ............ F16K 5/204 |
| JP | 49-53321 | 5/1974 | |
| JP | 51-162328 | 12/1976 | |
| JP | 57-48355 | 3/1982 | |
| JP | 58-028061 | 2/1983 | |
| JP | 6-47775 | 6/1994 | |
| JP | 6-49846 | 7/1994 | |
| JP | 7-167308 | 7/1995 | |
| JP | 2007-326012 | 12/2007 | |
| JP | 2008-232211 | 10/2008 | |

OTHER PUBLICATIONS

International Preliminary Report on Patentability and Written Opinion of the International Searching Authority issued Feb. 21, 2013 in International (PCT) Application No. PCT/JP2010/066891.
Extended European Search Report issued Aug. 7, 2014 in corresponding European Patent Application No. 10855342.1.

* cited by examiner

MECHANISM FOR MOVING CIRCULAR PLATE-SHAPED MEMBER

TECHNICAL FIELD

The present invention relates to an inverting mechanism that performs an inverting operation of a circular plate-shaped member such as a valve element of butterfly valves or an air distributor of fluidized bed apparatuses.

BACKGROUND ART

As is well known, a butterfly valve, for example, opens and closes a flow pass and adjusts a flow rate by rotating a support shaft that supports a circular plate-shaped valve element.

A common butterfly valve is typically provided with a rubber-made valve seat in order to improve the sealing efficiency when the valve is closed. However, as the valve element slides along the valve seat when the valve is opened and closed, the valve seat is abraded and the abrasion powder is possibly mixed in a distributed product as a foreign matter. Further, in the case of a large-diameter valve, a load due to the sliding between the valve element and the valve seat is large, and this possibly makes the opening and closing behavior of the valve unstable.

As a butterfly valve that is effective to such a problem, it is envisaged that the valve element is removed from the valve seat by positioning the valve shaft that supports the valve element in an inclined manner, and the valve element is rotated in this state by the valve shaft (see Patent Documents 1 to 3). With this configuration, it is possible to suppress the sliding between the valve element and the valve seat.

Further, in a fluidized bed apparatus that performs processes such as granulation, coating, and drying while a powder and granular material is floated and fluidized within a fluidized bed container to form a fluidized bed, a circular plate-shaped air distributor configured by a perforation plate (also referred to as a perforated plate) is disposed at a bottom section of the fluidized bed container, and a fluidized air is introduced into the fluidized bed container via the air distributor. Considering the convenience and the efficiency in cleaning of an interior of the fluidized bed container, a mechanism for inverting the air distributor is often provided (see Patent Document 4).

PRIOR ART DOCUMENTS

Patent Documents

Patent Document 1: Japanese Unexamined Utility Model Application Publication No. H06-47775
Patent Document 2: Japanese Unexamined Utility Model Application Publication No. H06-49846
Patent Document 3: Japanese Unexamined Patent Application Publication No. H07-167308
Patent Document 4: Japanese Unexamined Patent Application Publication No. 2007-326012

SUMMARY OF THE INVENTION

Problems to be Solved by the Invention

However, in the butterfly valve of the above configuration, a region around the outer peripheral surface of the valve shaft to be exposed to a space within the valve varies depending on the degree of inclination and the position of rotation of the valve shaft around the sealing section of the valve shaft. Therefore, when the valve is cleaned under a certain state, there is a region that cannot be cleaned in this state around the sealing section of the outer peripheral surface of the valve shaft, as being hidden inside the sealing section without being exposed, while being exposed to the space within the valve in another state. In other words, the cleaning efficiency of the butterfly valve of the above configuration is not very good. Further, it is not possible to sufficiently suppress the sliding between the valve element and the valve seat when inverting the valve element.

The above problem may occur, not only in the mechanism for inverting the valve element of the butterfly valve, but also in the mechanism for inverting the air distributor of the fluidized bed apparatus.

In view of the above circumstances, an object of the present invention is to suppress the sliding between a circular plate-shaped member, such as a valve element of butterfly valves or an air distributor of fluidized bed apparatuses, and a seating section on which the circular plate-shaped member is seated, as well as to improve the cleaning efficiency.

Solutions to the Problems

To address the above problem, the present invention provides a mechanism for inverting a circular plate-shaped member, the mechanism including: a tubular body having a seating section therein; a circular plate-shaped member seated on the seating section of the tubular body; a pair of support shafts supporting the circular plate-shaped member on both sides of the circular plate-shaped member; and a driving unit configured to drive and rotate at least one of the pair of support shafts, wherein as the support shafts is rotated by the driving unit, the circular plate-shaped member is inverted so as to make a predetermined angle with an axial direction of the tubular body, support shaft moving means configured to move each of the support shafts in an axial direction of the tubular body is provided, and when the circular plate-shaped member is seated on or removed from the seating section, the circular plate-shaped member is moved in the axial direction of the tubular body in a posture orthogonal to the axial direction of the tubular body as each support shaft is moved by the support shaft moving means.

In the above configuration, the support shaft moving means may include decentered shafts that are rotatably supported by a casing and in which the support shafts are respectively inserted in a decentered state, and an actuator configured to apply a force in the axial direction of the tubular body to at least one of the support shafts inserted into the decentered shafts in the decentered state.

The inverting mechanism of the present invention is suitable as a mechanism for inverting a valve element in a butterfly valve.

Alternatively, the inverting mechanism of the present invention is suitable as a mechanism for inverting an air distributor in a fluidized bed apparatus.

Effects of the Invention

According to the present invention, it is possible to suppress sliding between a circular plate-shaped member and a seating section, as well as to improve the cleaning efficiency.

EMBODIMENTS OF THE INVENTION

Hereinafter, an embodiment of the present invention will be described with reference to the drawings.

Figure 1:
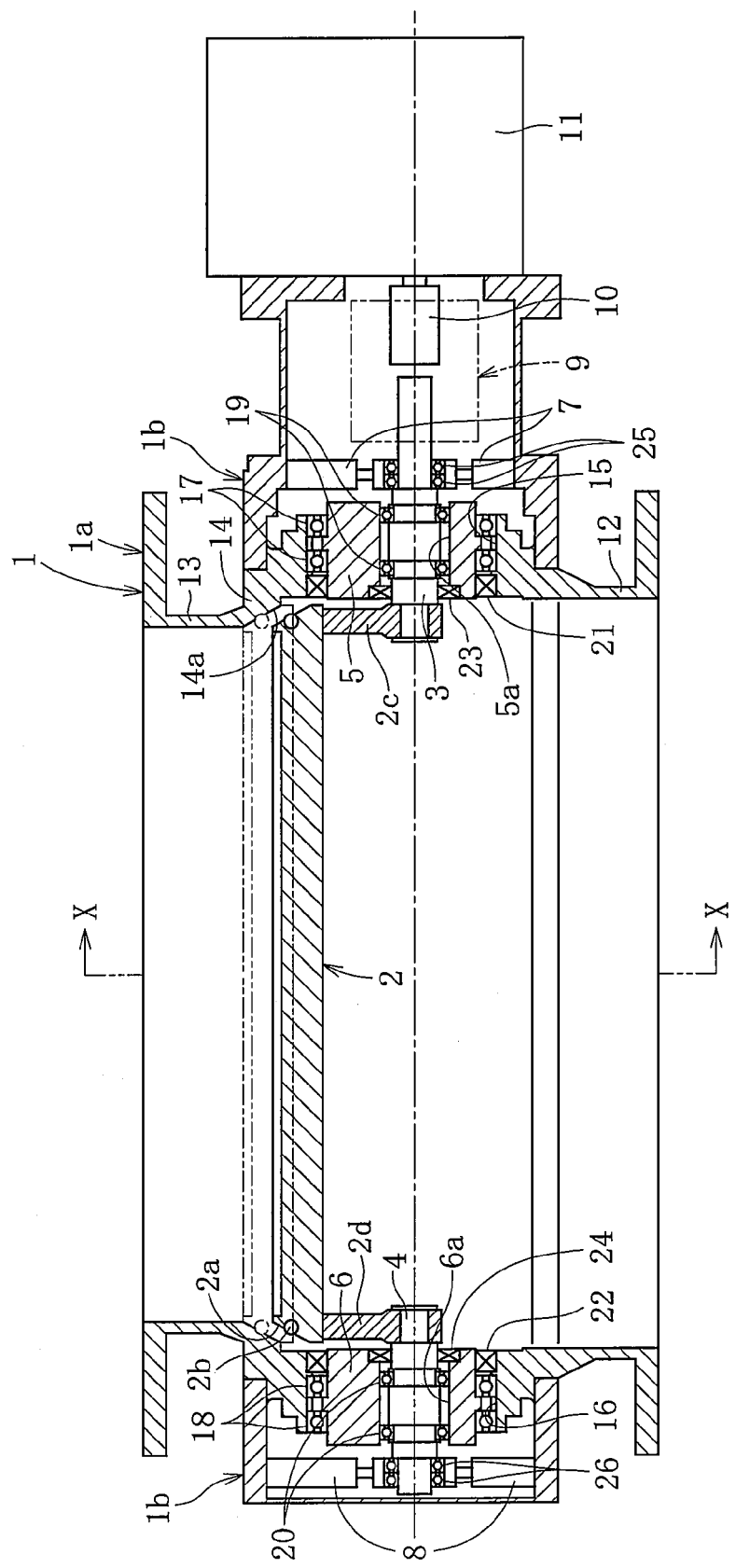
FIG. 1 is a longitudinal sectional view of a butterfly valve in a middle state, provided with an inverting mechanism according to an embodiment of the present invention.

FIG. 1 shows a longitudinal sectional view of a butterfly valve in a middle state, provided with an inverting mechanism according to an embodiment of the present invention. Further, FIG. 2B shows a cross-sectional view taken along line X-X in FIG. 1 viewed in a direction of arrows of the line. In this embodiment, this butterfly valve is used as an opening and closing valve of a container for storing powder or fluid (powder, in this embodiment).

The butterfly valve includes, as main components, a casing 1, a valve element 2, a pair of support shafts 3 and 4, a pair of support shaft moving means (a support shaft movement mechanism) constituted respectively by decentered shafts 5 and 6 and actuators such as air cylinders 7 and 8, a coupling section 9, a drive shaft 10, and a driving source 11.

The casing 1 is configured by a main casing 1a and sub casings 1b. The main casing 1a is cylindrical, and its interior space constitutes a flow pass of the powder. Each of open ends of the main casing 1a is provided with a flange for attachment of a different member. The main casing 1a is configured by a large-diameter section 12, a small-diameter section 13, and a valve seat 14 provided therebetween. A central axis of the main casing 1a extends along the vertical direction such that the small-diameter section 13 comes on the upper side and the large-diameter section 12 on the side opposite to the small-diameter section 13 comes on the lower side. An open end on the side of the small-diameter section 13 of the main casing 1a is connected to the container for storing powder. Accordingly, a direction in which the powder flows corresponds to a direction in the main casing 1a directed from the side of the small-diameter section 13 toward the side of the large-diameter section 12. The sub casings 1b are attached on respective sides of the main casing 1a, and cover the support shafts 3 and 4, the air cylinders 7 and 8, the coupling section 9, and the drive shaft 10.

A seating surface 14a of the valve seat 14, has a central axis in the vertical direction and its diameter increases gradually toward the lower side. In this embodiment, the seating surface 14a constitutes a tapered surface. The valve element 2 is seated on and removed from the seating surface 14a from below, and is circular plate-shaped in this embodiment whose central axis extends along the vertical direction in the state illustrated in FIG. 1. Further, at a circumferential edge section of a top surface of the valve element 2, a surface 2a whose diameter increases gradually toward the lower side in FIG. 1 is provided. In this embodiment, the surface 2a is a tapered surface. The surface 2a of the valve element 2 is provided with an annular groove, in which an O-ring 2b is fitted. As shown by an alternate long and two short dashes line in FIG. 1, the valve element 2 is seated on the seating surface 14a via the O-ring 2b with the surface 2a (see also FIG. 2A). Further, the O-ring 2b improves the sealing property of the valve element 2 in a seated state. Here, the sealing can also be provided by bringing the surface 2a of the valve element 2 in direct contact with the seating surface 14a without providing the O-ring 2b.

The pair of support shafts 3 and 4 support the valve element 2 on respective sides of the valve element 2 in a direction of the diameter respectively via attachment arms 2c and 2d. Central axes of the support shafts 3 and 4 are concentrical to each other. The support shaft 3 is rotated or restricted from rotation by the driving source 11 via the coupling section 9 and the drive shaft 10.

The pair of decentered shafts 5 and 6 are disposed on respective sides of the main casing 1a in a direction of the diameter so as to be concentrical to each other. The decentered shafts 5 and 6 are rotatably disposed respectively within through holes 15 and 16 provided in the large-diameter section 12 of the main casing 1a via radial bearings 17 and 18. The decentered shaft 5 is provided with a through hole 5a whose central axis is parallelly decentered with respect to a shaft center of the decentered shaft 5, and the decentered shaft 6 is provided with a through hole 6a whose central axis is parallelly decentered with respect to a shaft center of the decentered shaft 6. A distance between the shaft center of the decentered shaft 5 and the central axis of the through hole 5a is the same as a distance between the shaft center of the decentered shaft 6 and the central axis of the through hole 6a. The support shafts 3 and 4 are rotatably inserted respectively into the through holes 5a and 6a via radial bearings 19 and 20.

In this embodiment, in order to seal a space within the valve, a rotary-type seal lip 21 for a rotational shaft is provided between the through hole 15 and the decentered shaft 5, and a rotary-type seal lip 22 for a rotational shaft is provided between the through hole 16 and the decentered shaft 6. In addition, a rotary-type seal lip 23 for a rotational shaft is provided between the through hole 5a of the decentered shaft 5 and the support shaft 3, and a rotary-type seal lip 24 for a rotational shaft is provided between the through hole 6a of the decentered shaft 6 and the support shaft 4.

On the both sides of the main casing 1a, the pair of air cylinders 7 and 8 are respectively provided for the support shafts 3 and 4 via radial bearings 25 and 26. The air cylinder 7 moves the support shaft 3 by applying a force upward or downward in the vertical direction, and the air cylinder 8 moves the support shaft 4 by applying a force upward or downward in the vertical direction. In the application of the force, the support shaft moving means is configured such that the support shaft 3 is allowed to move parallelly in the horizontal direction, and the support shaft moving means is configured such that the support shaft 4 is allowed to move parallelly in the horizontal direction. The pair of support shaft moving means is configured such that the magnitudes and the directions of the forces applied to the support shafts 3 and 4 are identical to each other.

In the illustrated example in FIG. 1, the actuators that constitute the pair of support shaft moving means are the pair of air cylinders 7 and 8 disposed respectively on the upper side and the lower side of the radial bearings 25 and 26. Base ends of the pair of air cylinders 7 and 8 on the upper side and the lower side are fixed to the main casing 1a. Tip ends of piston rods of the pair of air cylinders 7 and 8 on the upper side and the lower side are contiguous with the radial bearings 25 and 26 slidably along the horizontal direction, and it is possible to allow the support shafts 3 and 4 to move parallelly in the horizontal direction by such a configuration. Further, the pair of air cylinders 7 and 8 on the upper side and the lower side move interlockingly. For example, the air cylinder on the upper side is retracted as the air cylinder on the lower side extends, and the air cylinder on the lower side is retracted as the air cylinder on the upper side extends.

In the state illustrated in FIG. 1, the drive shaft 10 is able to rotate or restrict the rotation of the support shaft 3 via the coupling section 9, and the support shaft 3 and the drive shaft 10 are concentrical with each other. The drive shaft 10 is rotated or restricted from rotation by the driving source 11. The driving source 11 is an oscillating motor (rotary actuator), for example, and fixed to the sub casings 1b.

An operation of the butterfly valve thus configured will be described below with reference to FIGS. 2A to 2C.

Figure 2A:
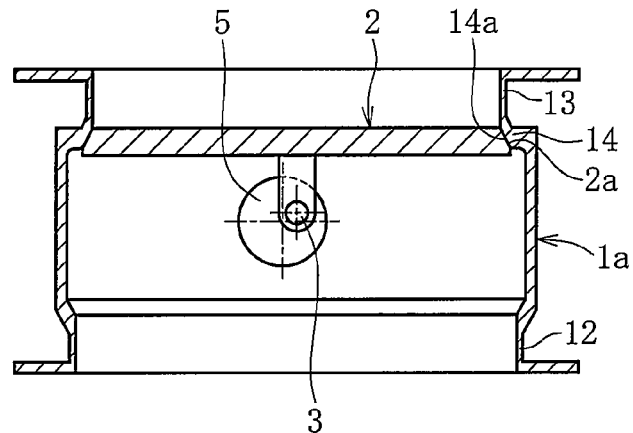
FIG. 2A is a cross-sectional view taken along line X-X in FIG. 1 viewed in a direction of arrows of the line schematically illustrating an operation of the butterfly valve, in which the butterfly valve is shown in a closed state.
Figure 2B:
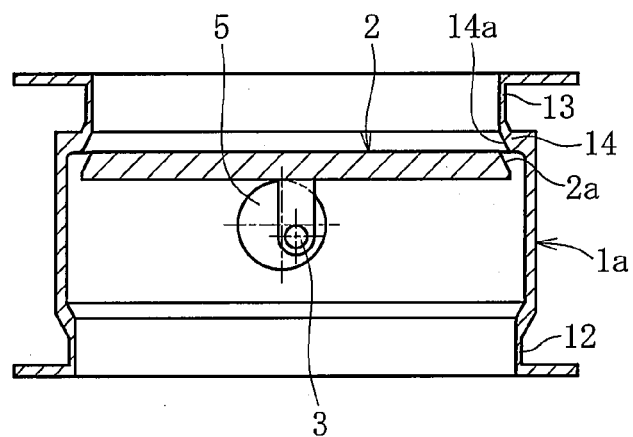
FIG. 2B is a cross-sectional view taken along line X-X in FIG. 1 viewed in a direction of arrows of the line schematically illustrating the operation of the butterfly valve, in which the butterfly valve is shown in the middle state.

FIG. 2A is a cross-sectional view taken along line X-X in FIG. 1 viewed in a direction of arrows of the line schematically illustrating an operation of the butterfly valve, in which the butterfly valve is shown in a closed state. FIG. 2B is a cross-sectional view taken along line X-X in FIG. 1 viewed in a direction of arrows of the line schematically illustrating the operation of the butterfly valve, in which the butterfly valve is shown in the middle state. FIG. 2C is a cross-sectional view taken along line X-X in FIG. 1 viewed in a direction of arrows of the line schematically illustrating the operation of the butterfly valve, in which the butterfly valve is shown in an opened state.

Referring to FIG. 2B, a central axis of the valve element 2 is concentrical with the central axis of the main casing 1a, that is, extends along the vertical direction. In other words, the top surface and a bottom surface of the valve element 2 lie horizontally, and the valve element 2 is in a horizontal posture. The drive shaft 10 is in a state in which its rotation is restricted by the driving source 11. While the following description is given on the side of the support shaft 3, the support shaft 4, the decentered shaft 6, and the air cylinder 8 on the side of the support shaft 4 operate similarly to the support shaft 3, the decentered shaft 5, and the air cylinder 7, respectively, and the description for the operation of these components is omitted.

In the state illustrated in FIG. 2B, a force upward in the vertical direction is applied to the support shaft 3 by the air cylinder 7. With this, the support shaft 3 rotates the decentered shaft 5 in a counterclockwise direction, and the valve element 2 moves while maintaining the horizontal posture. Then, as illustrated in FIG. 2A, the valve element 2 is seated on the valve seat 14. This is the closed state of the butterfly valve.

More specifically, at this time, the support shaft 3 is guided into the through hole 15 of the decentered shaft 5. Accordingly, the shaft center of the support shaft 3 moves along a circumferential direction of the decentered shaft 5. At this time, the coupling section 9 allows the movement of the support shaft 3 with respect to the drive shaft 10. It should be noted that in the illustrated example of FIG. 1, the movement of the support shaft 3 in the horizontal direction with respect to the air cylinder 7 at this time is allowed by the radial bearing 25 sliding against the tip end of the piston rod.

In the state illustrated in FIG. 2A, a force downward in the vertical direction is applied to the support shaft 3 by the air cylinder 7. Then, the support shaft 3 rotates the decentered shaft 5 in a clockwise direction, and the valve element 2 moves while maintaining the horizontal posture. This results in the state shown in FIG. 2B. The detailed operation at this time is the same as described above, and therefore the description is omitted.

In the state in FIG. 2B, the drive shaft 10 is driven and rotated in the clockwise direction by the driving source 11. Then, as illustrated in FIG. 2C, the driving source 11 stops at a position where the support shaft 3 is rotated by a predetermined angle, for example, 90 degrees. This is the opened state of the butterfly valve.

Figure 2C:
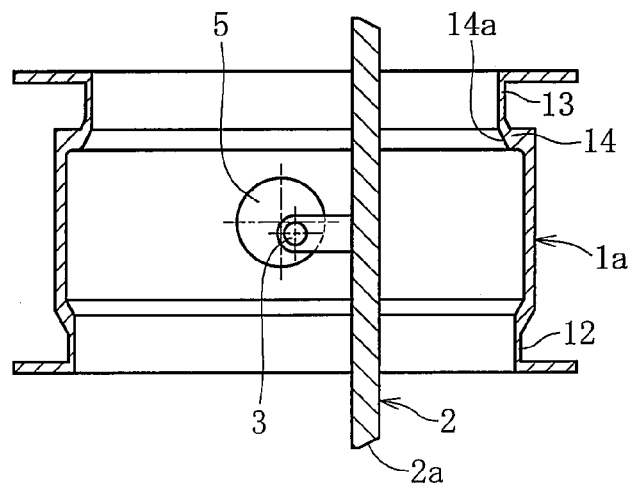
FIG. 2C is a cross-sectional view taken along line X-X in FIG. 1 viewed in a direction of arrows of the line schematically illustrating the operation of the butterfly valve, in which the butterfly valve is shown in an opened state.

In the state illustrated in FIG. 2C, the drive shaft 10 is driven and rotated in the counterclockwise direction by the driving source 11. Then, the support shaft 3 rotates in the counterclockwise direction along with the valve element 2, resulting in the state shown in FIG. 2B. In this state, the driving source 11 stops. Thereafter, when a force upward in the vertical direction is applied to the support shaft 3 by the air cylinder 7, the valve element 2 moves while maintaining the horizontal posture to be seated on the valve seat 14.

With the configuration and the operation described above, the butterfly valve according to this embodiment provides effects as described below.

The valve element 2 in a removed state is rotated as the support shaft 3 is rotated by the drive shaft 10. In addition, when the valve element 2 is seated on and removed from the seating surface 14a whose central axis increases gradually toward the lower side in the vertical direction, the valve element 2 maintains the horizontal posture. From these reasons, the sliding between the valve element 2 and the valve seat 14 can be suppressed as the butterfly valve changes between the opened and closed states.

Further, the rotary-type seal lips 21 and 22 for rotational shafts are respectively provided between the through hole 15 and the decentered shaft 5 and between the through hole 16 and the decentered shaft 6. Moreover, the rotary-type seal lips 23 and 24 for rotational shafts are respectively provided between the through hole 5a of the decentered shaft 5 and the support shaft 3 and between the through hole 6a of the decentered shaft 6 and the support shaft 4. Therefore, regions of the outer peripheral surfaces of the decentered shafts 5 and 6 and the support shafts 3 and 4 that are to be exposed to the space within the valve are constant regardless of the state of the valve. Accordingly, it is possible to improve the cleaning efficiency at peripheral regions of the rotary-type seal lips 21 and 22 and the rotary-type seal lips 23 and 24 at the outer peripheral surfaces of the decentered shafts 5 and 6 and the support shafts 3 and 4.

While according to the embodiment described above, the coupling section 9 is provided between the support shaft 3 and the drive shaft 10, the present invention is not limited to such a configuration. For example, the support shaft 3 and the drive shaft 10 may be directly fixed, and the drive shaft 10 and the driving source 11 may be moved along with the support shaft 3 when the valve element 2 is seated and removed.

Figure 3:
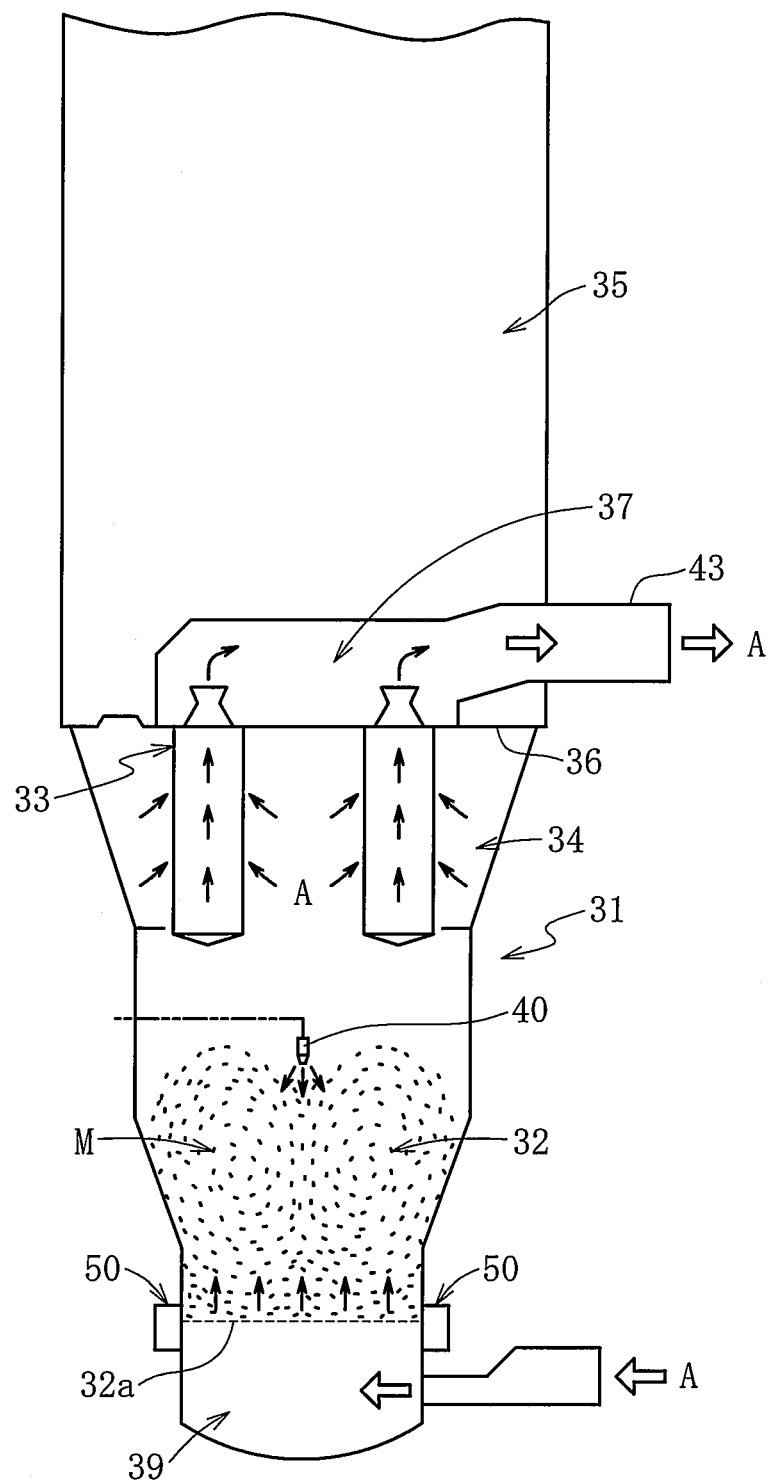
FIG. 3 is a longitudinal sectional view of a fluidized bed apparatus provided with the inverting mechanism according to the embodiment of the present invention.

FIG. 3 illustrates an embodiment of the present invention utilized in a fluidized bed apparatus. A fluidized bed container 31 of the fluidized bed apparatus is provided with a processing chamber 32 configured to perform a process of a powder and granular material M, such as granulation or coating of the powder and granular material M, a filter chamber 34 positioned above the processing chamber 32 and having a filter unit 33 for solid-gas separation, an upper chamber 35 positioned above the filter chamber 34, an upper wall 36 separating the filter chamber 34 from the upper chamber 35, and an exhaust chamber 37 disposed above the filter unit 33.

At a bottom section of the processing chamber 32, there is disposed a circular plate-shaped air distributor 32a configured by a perforation plate (or a metal mesh) such as punched metal. A gaseous matter A such as heated air supplied to an air supply chamber 39 through a supply air duct is introduced into the fluidized bed container 31 via the air distributor 32a. Further, a spray nozzle 40 for spraying spray liquid (such as a liquid coating agent or a liquid binding agent) is disposed at an upper section of the processing chamber 32.

The powder and granular material M stored in the processing chamber 32 of the fluidized bed container 31 is floated and fluidized by the gaseous matter A introduced into the fluidized bed container 31 via the air distributor 32a. Then, the spray liquid (such as liquid coating agent or a liquid binding agent) is sprayed from the spray nozzle 40 against a fluidized bed of the powder and granular material M. At the same time, as particles of the powder and granular material M are moistened by a mist of the spray liquid sprayed from the spray nozzle 40, for example, the liquid coating agent, a solid component contained in the liquid coating agent is attached to a surface of particles of the powder and granular material M and dried and solidified, and a covering layer is disposed on the surface of the particles of the powder and granular material M (coating). Alternatively, the particles of the powder and granular material M are moistened by a mist of the spray liquid sprayed from the spray nozzle 40, for example, the liquid binding agent, adhered and agglutinated, and dried to grow into particles of a predetermined diameter (granulation).

The gaseous matter A that has caused the powder and granular material M to be floated and fluidized drifts upward in the processing chamber 32, enters the filter chamber 34, goes through solid-gas separation by the filter unit 33, and flows into the exhaust chamber 37. Then, the gaseous matter A is exhausted outside the fluidized bed container 31 through an exhaust air duct 43 connected to the exhaust chamber 37.

In this embodiment, an inverting mechanism 50 for inverting the circular plate-shaped air distributor 32a is provided on a side section of the fluidized bed container 31. A basic configuration of the inverting mechanism 50 is the same as that described in the above embodiment, and an object to be inverted in this embodiment is the air distributor 32a. The air distributor 32a is inverted by the inverting mechanism 50 when cleaning an interior of the fluidized bed container 31 and the filter unit 33, and such.

It should be noted that the present invention is not limited to the above embodiments, and may be variously modified within the scope of the technical idea.

DESCRIPTION OF REFERENCE SIGNS

1: casing
2: valve element
3, 4: support shaft
5, 6: decentered shaft
10: drive shaft
11: driving source
14: valve seat
14a: seating surface
31: fluidized bed container
32a: air distributor

The invention claimed is:

1. A mechanism for moving a circular plate-shaped member, the mechanism comprising:
    a tubular body having a seating section therein;
    a circular plate-shaped member to be seated on the seating section of the tubular body;
    a support shaft movement mechanism including a pair of decentered shafts rotatably supported by the tubular body and disposed along a direction parallel to a diameter of the tubular body;
    a pair of support shafts supporting the circular plate-shaped member on both sides of the circular plate-shaped member and being disposed along a direction parallel to a diameter of the circular plate-shaped member, each of the support shafts being inserted into a respective one of the decentered shafts and being decentered with respect to the respective one of the decentered shafts; and
    a driving unit configured to drive and rotate at least one of the support shafts, wherein
    as the at least one support shaft is rotated by the driving unit, the circular plate-shaped member is rotated so as to make a predetermined angle with an axial direction of the tubular body,
    the support shaft movement mechanism is configured to move each of the support shafts in the axial direction of the tubular body by applying a force in the axial direction of the tubular body to each of the support shafts,
    the decentered shafts are rotated by movement of the support shafts, and
    when the circular plate-shaped member is seated on or removed from the seating section, the circular plate-shaped member is moved in the axial direction of the tubular body in a posture orthogonal to the axial direction of the tubular body as each of the support shafts is moved by the support shaft movement mechanism.

2. The mechanism for moving a circular plate-shaped member according to claim 1, wherein
    the support shaft movement mechanism also includes an actuator configured to apply a force in the axial direction of the tubular body to at least one of the support shafts.

3. The mechanism for moving a circular plate-shaped member according to claim 2, wherein
    the mechanism is mounted to a fluidized bed apparatus and performs a moving operation of an air distributor of the fluidized bed apparatus.

4. The mechanism for moving a circular plate-shaped member according to claim 1, wherein
    the mechanism is mounted to a fluidized bed apparatus and performs a moving operation of an air distributor of the fluidized bed apparatus.

5. The mechanism for moving a circular plate-shaped member according to claim 1, wherein
    the decentered shafts are parallel to the support shafts.

6. A butterfly valve comprising:
    a tubular body having a seating section therein;
    a valve element to be seated on the seating section of the tubular body;
    a support shaft movement mechanism including a pair of decentered shafts rotatably supported by the tubular body and disposed along a direction parallel to a diameter of the tubular body;
    a pair of support shafts supporting the valve element on both sides of the valve element and being disposed along a direction parallel to a diameter of the valve element, each of the support shafts being inserted into a respective one of the decentered shafts and being decentered with respect to the respective one of the decentered shafts; and a driving unit configured to drive and rotate at least one of the support shafts, wherein as the at least one support shaft is rotated by the driving unit, the valve element is rotated so as to make a predetermined angle with an axial direction of the tubular body, the support shaft movement mechanism is configured to move each of the support shafts in the axial direction of the tubular body by applying a force in the axial direction of the tubular body to each of the support shafts, the decentered shafts are rotated by movement of the support shafts, and when the valve element is seated on or removed from the seating section, the valve element is moved in the axial direction of the tubular body in a posture orthogonal to the axial direction of the tubular body as each of the support shafts is moved by the support shaft movement mechanism.

7. A butterfly valve according to claim 6, wherein the decentered shafts are parallel to the support shafts.

8. A butterfly valve comprising:

a tubular body having a seating section therein;

a valve element to be seated on the seating section of the tubular body;

a support shaft movement mechanism including a pair of decentered shafts rotatably supported by the tubular body and an actuator and disposed along a direction parallel to a diameter of the tubular body;

a pair of support shafts supporting the valve element on both sides of the valve element and being disposed along a direction parallel to a diameter of the valve element, each of the support shafts being inserted into a respective one of the decentered shafts and being decentered with respect to the respective one of the decentered shafts; and a driving unit configured to drive and rotate at least one of the support shafts, wherein the actuator is configured to apply a force in the axial direction of the tubular body to at least one of the support shafts, as the at least one support shaft is rotated by the driving unit, the valve element is rotated so as to make a predetermined angle with an axial direction of the tubular body, the support shaft movement mechanism is configured to move each of the support shafts in the axial direction of the tubular body by applying a force in the axial direction of the tubular body to each of the support shafts, the decentered shafts are rotated by movement of the support shafts, and when the valve element is seated on or removed from the seating section, the valve element is moved in the axial direction of the tubular body in a posture orthogonal to the axial direction of the tubular body as each of the support shafts is moved by the support shaft movement mechanism.

9. A butterfly valve according to claim 8, wherein the decentered shafts are parallel to the support shafts.

* * * * *